US012628959B2

(12) United States Patent
Baker et al.

(10) Patent No.: US 12,628,959 B2
(45) Date of Patent: May 19, 2026

(54) FURNITURE ITEM WITH CIRCUIT BOARD ASSEMBLY

(71) Applicant: La-Z-Boy Incorporated, Monroe, MI (US)

(72) Inventors: Jason M. Baker, Ooltewah, TN (US); Scott Jorbel, Hixson, TN (US)

(73) Assignee: La-Z-Boy Incorporated, Monroe, MI (US)

( * ) Notice: Subject to any disclaimer, the term of this patent is extended or adjusted under 35 U.S.C. 154(b) by 225 days.

(21) Appl. No.: 18/422,546

(22) Filed: Jan. 25, 2024

(65) Prior Publication Data

US 2024/0251955 A1      Aug. 1, 2024

Related U.S. Application Data

(60) Provisional application No. 63/441,344, filed on Jan. 26, 2023.

(51) Int. Cl.
*A47C 20/04*          (2006.01)
*F16B 2/22*           (2006.01)

(52) U.S. Cl.
CPC .............. *A47C 20/041* (2013.01); *F16B 2/22* (2013.01)

(58) Field of Classification Search
CPC ............. A47C 20/041; F16B 2/22; F16B 2/20
See application file for complete search history.

(56) References Cited

U.S. PATENT DOCUMENTS

| | | | |
|---|---|---|---|
| 4,285,543 A | 8/1981 | Clark | |
| 5,061,010 A | 10/1991 | LaPointe | |

| | | | |
|---|---|---|---|
| 5,628,546 A | 5/1997 | Boetzkes | |
| 5,864,105 A | 1/1999 | Andrews | |
| 5,926,002 A | 7/1999 | Cavanaugh et al. | |
| 6,008,598 A | 12/1999 | Luff et al. | |
| D443,596 S | 6/2001 | Ohkuma | |

(Continued)

FOREIGN PATENT DOCUMENTS

| | | |
|---|---|---|
| CA | 3204241 A1 | 3/2019 |
| CN | 1804954 A | 7/2006 |

(Continued)

OTHER PUBLICATIONS

Office Action regarding German Patent Application No. 1120200017303, Aug. 25, 2025 [Google translation].

(Continued)

*Primary Examiner* — Rodney A Bonnette
(74) *Attorney, Agent, or Firm* — Harness, Dickey & Pierce, P.L.C.

(57)          ABSTRACT

A furniture item may include a base frame, a seat assembly, a linkage, a circuit board, a linkage, and circuit board assembly. The seat assembly may be supported by the base frame. The linkage may be configured to move at least one component of the seat assembly. The circuit board assembly may include a circuit board and an enclosure. The circuit board is housed within the enclosure and is in communication with an electric component. The enclosure may include a body, a first clip attached to the body, a second clip attached to the body, a first tab attached to the body, and a second tab attached to the body. The first and second clips and the first tab may engage a link of the linkage. The second tab may engage a beam of base frame.

21 Claims, 12 Drawing Sheets

(56) References Cited

U.S. PATENT DOCUMENTS

| | | | |
|---|---|---|---|
| 6,320,341 | B1 | 11/2001 | Oka et al. |
| 6,492,786 | B1 | 12/2002 | Vang et al. |
| 6,688,699 | B1 | 2/2004 | Bowie |
| 6,794,841 | B1 | 9/2004 | Vang et al. |
| 7,393,053 | B2 | 7/2008 | Kurrasch et al. |
| D595,667 | S | 7/2009 | Lasky et al. |
| D595,668 | S | 7/2009 | Lasky et al. |
| D611,914 | S | 3/2010 | Chiang et al. |
| D617,744 | S | 6/2010 | Landerholm et al. |
| 8,106,325 | B2 | 1/2012 | Laurent et al. |
| 8,376,440 | B2 | 2/2013 | Kramer |
| D689,825 | S | 9/2013 | Wenji et al. |
| 8,754,344 | B2 | 6/2014 | Chiba |
| 8,781,691 | B2 | 7/2014 | Maeda et al. |
| 9,131,783 | B2 | 9/2015 | Chacon et al. |
| D740,763 | S | 10/2015 | Wenji |
| 9,214,307 | B2 | 12/2015 | Koch et al. |
| 9,236,822 | B2 | 1/2016 | Hille et al. |
| 9,241,574 | B2 | 1/2016 | Koch |
| 9,252,692 | B2 | 2/2016 | Hille |
| D758,975 | S | 6/2016 | Hunter et al. |
| 9,412,262 | B2 | 8/2016 | Baker et al. |
| D766,848 | S | 9/2016 | Gong |
| 9,655,458 | B2 | 5/2017 | Jacobs et al. |
| 9,715,822 | B2 | 7/2017 | Hille |
| 9,730,518 | B1 | 8/2017 | Jacobs et al. |
| 9,792,810 | B2 | 10/2017 | Hille et al. |
| 9,804,632 | B2 | 10/2017 | Gassner |
| 9,833,083 | B2 | 12/2017 | Koch |
| 9,836,034 | B2 | 12/2017 | Hille et al. |
| D813,179 | S | 3/2018 | Wu et al. |
| D828,309 | S | 9/2018 | Tang et al. |
| 10,213,352 | B2 | 2/2019 | Hille |
| D875,110 | S | 2/2020 | Spors et al. |
| D875,693 | S | 2/2020 | Gassner |
| D885,353 | S | 5/2020 | Li et al. |
| D897,968 | S | 10/2020 | Beilfuss et al. |
| D897,969 | S | 10/2020 | Beilfuss et al. |
| D897,970 | S | 10/2020 | Beilfuss et al. |
| 10,932,379 | B2 | 2/2021 | Mcpherson et al. |
| 2002/0000740 | A1 | 1/2002 | Laughlin et al. |
| 2004/0004376 | A1 | 1/2004 | Cabebe |
| 2008/0053699 | A1 | 3/2008 | Nakayama et al. |
| 2010/0217164 | A1 | 8/2010 | Meyer et al. |
| 2011/0077561 | A1 | 3/2011 | Choly |
| 2011/0174926 | A1 | 7/2011 | Margis et al. |
| 2011/0198894 | A1 | 8/2011 | Hsieh et al. |
| 2012/0105233 | A1 | 5/2012 | Bobey et al. |
| 2013/0169065 | A1 | 7/2013 | Koch et al. |
| 2014/0197666 | A1 | 7/2014 | Koch |
| 2014/0250594 | A1 | 9/2014 | Rawls-Meehan |
| 2014/0306505 | A1 | 10/2014 | Koch |
| 2014/0353134 | A1 | 12/2014 | Muller |
| 2016/0135598 | A1 | 5/2016 | Andoloro et al. |
| 2016/0161623 | A1* | 6/2016 | Chacon ................ A47C 20/041 |
| | | | 324/658 |
| 2016/0300205 | A1* | 10/2016 | Lute ...................... G07F 19/205 |
| 2017/0042340 | A1* | 2/2017 | Chacon ................... A47C 7/62 |
| 2017/0051848 | A1 | 2/2017 | Curiel Montoya et al. |
| 2017/0105540 | A1 | 4/2017 | Jacobs et al. |
| 2017/0245386 | A1 | 8/2017 | Park |
| 2017/0287657 | A1 | 10/2017 | Naka et al. |
| 2018/0065529 | A1* | 3/2018 | Line ...................... B60N 2/682 |
| 2018/0184811 | A1 | 7/2018 | Nava et al. |
| 2018/0301918 | A1 | 10/2018 | Lupo et al. |
| 2018/0310421 | A1* | 10/2018 | Kato ......................... F16B 2/22 |
| 2018/0338625 | A1 | 11/2018 | Nava et al. |
| 2019/0374039 | A1 | 12/2019 | Hosokawa et al. |
| 2020/0178702 | A1 | 6/2020 | Shino et al. |
| 2020/0214448 | A1 | 7/2020 | Jacobs et al. |
| 2020/0253379 | A1 | 8/2020 | Song |
| 2020/0305256 | A1 | 9/2020 | Tachikawa et al. |
| 2020/0305609 | A1 | 10/2020 | Rains et al. |
| 2020/0315043 | A1* | 10/2020 | Mcpherson .......... H05K 5/0247 |

FOREIGN PATENT DOCUMENTS

| | | | |
|---|---|---|---|
| CN | 102396115 | A | 3/2012 |
| CN | 102460848 | A | 5/2012 |
| CN | 102947143 | A | 2/2013 |
| CN | 204077419 | U | 1/2015 |
| CN | 105210004 | A | 12/2015 |
| CN | 106891788 | A | 6/2017 |
| DE | 102013021252 | A1 | 7/2014 |
| EP | 0717472 | A2 | 6/1996 |
| FR | 3029869 | A1 | 6/2016 |
| GB | 1213185 | A | 11/1970 |
| JP | 2003143736 | A | 5/2003 |
| KR | 20110137142 | A | 12/2011 |
| KR | 20170097917 | A | 8/2017 |
| WO | 2010080178 | A2 | 7/2010 |
| WO | 2018216388 | A1 | 11/2018 |

OTHER PUBLICATIONS

Chinese Office Action regarding Patent Application No. 202080024738. 5, dated May 16, 2024.

Chinese Office Action and Search Report regarding Application No. 202080032399.5, dated May 20, 2024.

International Search Report for Application No. PCT/US2020/026007, dated Jul. 9, 2020.

Written Opinion of the International Searching Authority for Application No. PCT/US2020/026007, dated Jul. 9, 2020.

International Search Report for Application No. PCT/US2020/025987, dated Jul. 17, 2020.

Written Opinion of the International Searching Authority for Application No. PCT/US2020/025987, deted Jul. 17, 2020.

Australian Office Action regarding Application No. 2020253371 dated Mar. 25, 2025.

International Search Report and Written Opinion of the ISA issued in PCT/US2024/013032, mailed May 24, 2024; ISA/US.

* cited by examiner

FURNITURE ITEM WITH CIRCUIT BOARD ASSEMBLY

CROSS-REFERENCE TO RELATED APPLICATIONS

This application claims the benefit of U.S. Provisional Application No. 63/441,344, filed on Jan. 26, 2023. The entire disclosure of the above application is incorporated herein by reference.

FIELD

The present disclosure relates to a furniture item with a circuit board assembly.

BACKGROUND

This section provides background information related to the present disclosure and is not necessarily prior art.

A furniture item (e.g., a chair, sofa, loveseat, chaise, etc.) can include one or more motors for driving various components of the furniture item (e.g., legrest mechanisms, recline mechanisms, lumbar adjustment mechanisms, massage features, etc.). A circuit board may be provided to control operation of such motors and/or other electrical accessories. The present disclosure provides a circuit board assembly including a circuit board and an enclosure that protects the circuit board and allows for easy and convenient installation and servicing of the circuit board assembly.

SUMMARY

This section provides a general summary of the disclosure and is not a comprehensive disclosure of its full scope or all of its features.

In one form, the present disclosure provides a furniture item that may include a base frame, a seat assembly, a linkage, a circuit board, a linkage, and circuit board assembly. The seat assembly may be supported by the base frame. The linkage may be configured to move at least one component of the seat assembly. The circuit board assembly may include a circuit board and an enclosure. The circuit board is housed within the enclosure and is in communication with an electric component (e.g., a motor or electrical accessory of the furniture item). The enclosure may include a body, a first clip attached to the body, a second clip attached to the body, a first tab attached to the body, and a second tab attached to the body. The first and second clips and the first tab may engage a link of the linkage. The second tab may engage a beam of base frame.

In some configurations of the furniture item of the above paragraph, the enclosure includes a third tab that engages the link. A fastener may extend through an aperture in the third tab and an aperture in the link.

In some configurations of the furniture item of either of the above paragraphs, the link includes a flange that engages the beam.

In some configurations of the furniture item of any one or more of the above paragraphs, fasteners may extend through apertures in the flange and apertures in the beam.

In some configurations of the furniture item of any one or more of the above paragraphs, the second tab and the flange are coplanar.

In some configurations of the furniture item of any one or more of the above paragraphs, the first and third tabs extend away from a first end of the enclosure in a first direction, and the second tab extends away from a second end of the enclosure in a second direction.

In some configurations, the second direction is perpendicular to the first direction.

In some configurations of the furniture item of any one or more of the above paragraphs, the furniture item includes a motor operable to drive the linkage, wherein the circuit board is in communication with the motor.

In some configurations of the furniture item of any one or more of the above paragraphs, the enclosure includes a cable retainer having a first arm and a second arm that cooperate with each other to form a channel that receives at least one electrical cable.

In some configurations of the furniture item of any one or more of the above paragraphs, each of the first and second arms includes a fixed end and a free end, wherein the fixed ends of the first and second arms are integrally formed with a body of the enclosure. The free ends of the first and second arms are movable relative to the body and each other.

In some configurations of the furniture item of any one or more of the above paragraphs, each of the first and second clips includes a fixed end and a free end.

In some configurations of the furniture item of any one or more of the above paragraphs, the fixed ends are integrally formed with the body of the enclosure, wherein the free ends are resiliently movable outward relative to the body.

In some configurations of the furniture item of any one or more of the above paragraphs, the free end of the first clip includes a curved tip that curves outward away from the body.

In some configurations of the furniture item of any one or more of the above paragraphs, the free end of the first clip presses down against the link to retain the link against the body of the enclosure.

In some configurations of the furniture item of any one or more of the above paragraphs, the free end of the second clip includes a ramped portion defining a ledge that retains an edge of the link and retains the link between the ledge and the fixed end of the first clip.

In some configurations of the furniture item of any one or more of the above paragraphs, the edge is disposed between two tabs formed on the link, and wherein the ramped portion of the second clip may be partially received between the tabs formed on the link.

In some configurations of the furniture item of any one or more of the above paragraphs, the first tab of the enclosure engages the link, and wherein the first and second tabs cooperate to prevent relative rotation between the enclosure and the link.

In some configurations of the furniture item of any one or more of the above paragraphs, the first tab of the enclosure extends in a first direction relative to the body of the enclosure, wherein the second tab of the enclosure extend extends in a second direction relative to the body of the enclosure.

In some configurations of the furniture item of any one or more of the above paragraphs, the first direction is perpendicular to the second direction.

In some configurations of the furniture item of any one or more of the above paragraphs, the enclosure includes a third tab extending from the body and engaging the link.

In some configurations of the furniture item of any one or more of the above paragraphs, the third tab extends in a direction parallel to the first direction.

In some configurations of the furniture item of any one or more of the above paragraphs, the ledge of the second clip faces the free end of the first clip.

In some configurations of the furniture item of any one or more of the above paragraphs, the free end of the first clip is disposed between the ledge of the second clip and the fixed end of the first clip.

In some configurations of the furniture item of any one or more of the above paragraphs, the fixed end of the second clip is disposed between the ledge of the second clip and the free end of the first clip.

In some configurations of the furniture item of any one or more of the above paragraphs, the fixed end of the first clip is curved.

In some configurations of the furniture item of any one or more of the above paragraphs, the free end of the second clip is depressible into an internal cavity of the body of the enclosure, and wherein the circuit board is disposed within the internal cavity.

In some configurations of the furniture item of any one or more of the above paragraphs, the fixed end of the first clip extends away from a surface of the body of the enclosure.

In some configurations of the furniture item of any one or more of the above paragraphs, the fixed end of the second clip is flush with the surface of the body of the enclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
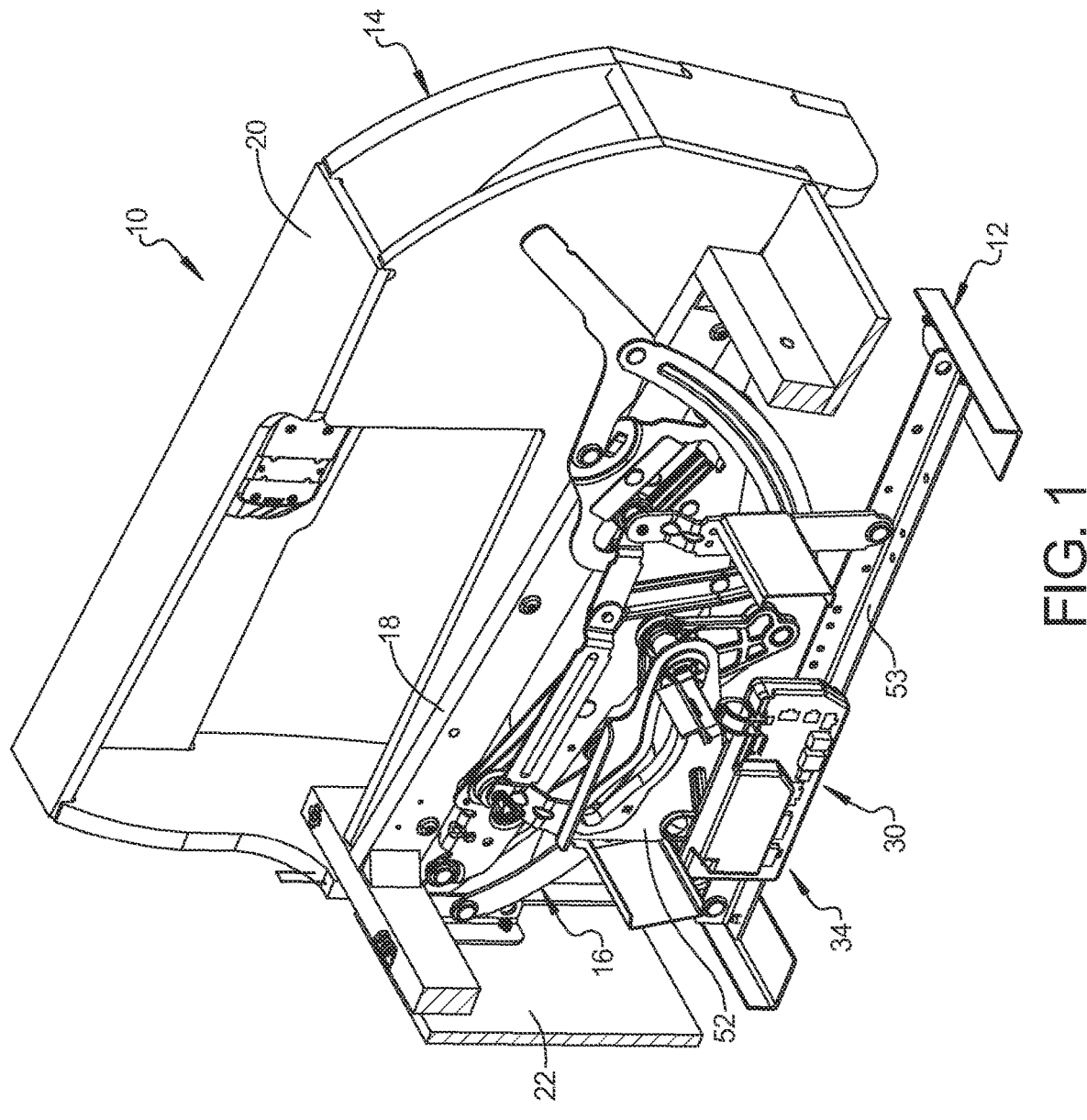
FIG. 1 is a partial perspective view of a furniture item having a circuit board assembly according to the principles of the present disclosure.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a portion of a furniture item 10 is shown. The furniture item 10 may include a base frame 12 and a seat assembly 14. The base frame 12 may be a stationary frame and supports the seat assembly 14 for movement relative to the base frame 12. The seat assembly 14 may include a legrest mechanism 16 (partially shown in FIG. 1), a seat bottom frame 18, a seatback (not shown), an armrest frame 20, and a legrest platform 22. The legrest mechanism 16 may include a pantograph linkage and is coupled to the legrest platform 22 to move the legrest platform 22 between a stowed position and an extended position. The furniture item 10 may include one or more motors (not shown) that may be operable to drive the seatback relative to the seat bottom frame 18 between a reclined position and an upright position and/or drive the legrest mechanism 16 and legrest platform 22 between the stowed and extended positions. In some configurations, the furniture item 10 may include additional motors and/or other electrical accessories such as electric heaters, motor-driven massage features, a charger for a portable electronic device, etc.

Figure 2:
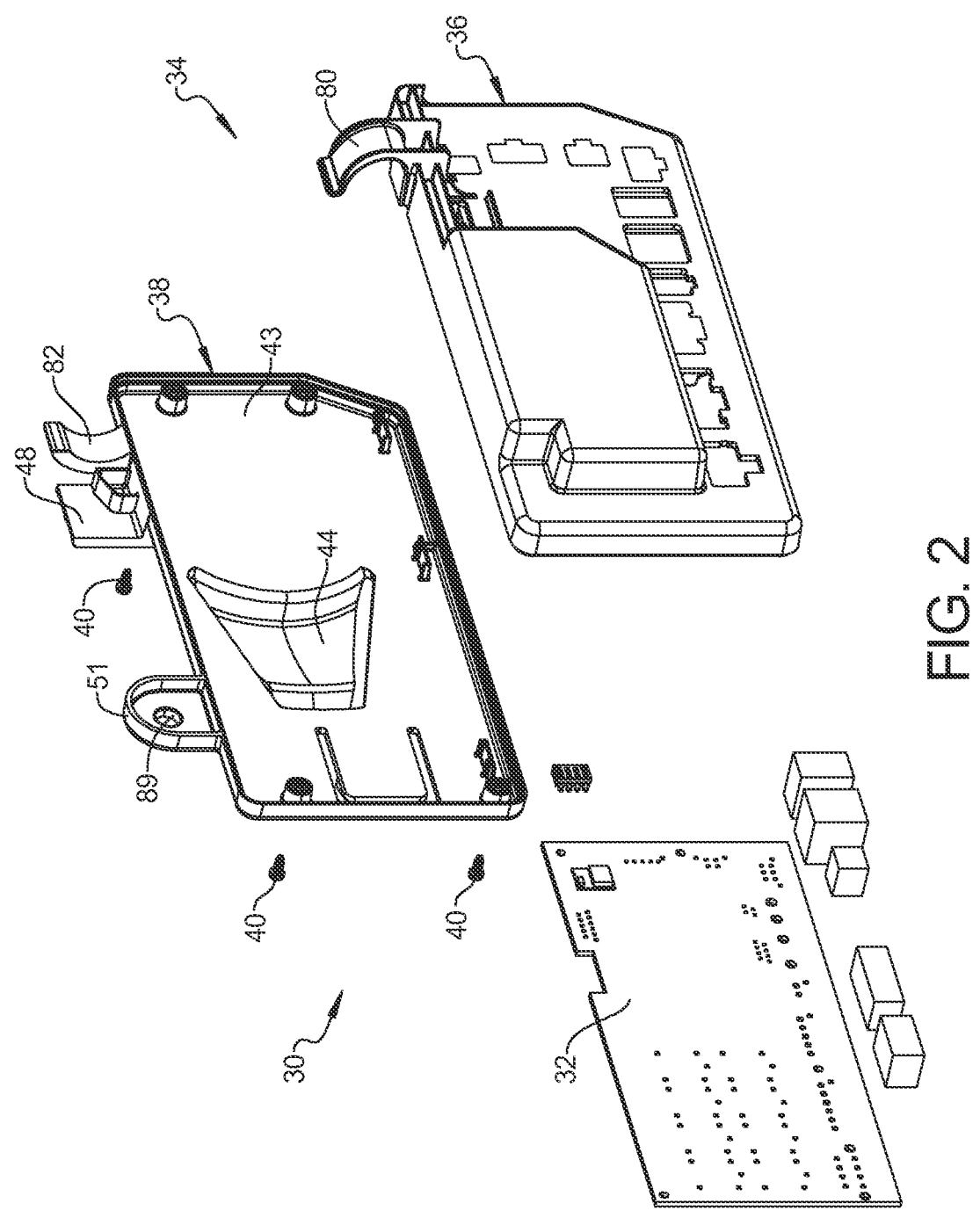
FIG. 2 is an exploded view of the circuit board assembly.

The furniture item 10 includes a circuit board assembly 30 including a circuit board 32 (FIG. 2) and an enclosure 34 that houses the circuit board 32. The circuit board 32 may be electrically connected to a power supply (e.g., a battery or an electrical outlet), the one or more motors, one or more motion-control devices, and/or any other electrical accessories of the furniture item 10. The motion-control devices may include or communicate with one or more user interfaces (e.g., switches, buttons, knobs, touchscreen interface, etc.) on a wired control panel or a wireless remote-control device, for example.

Figure 3:
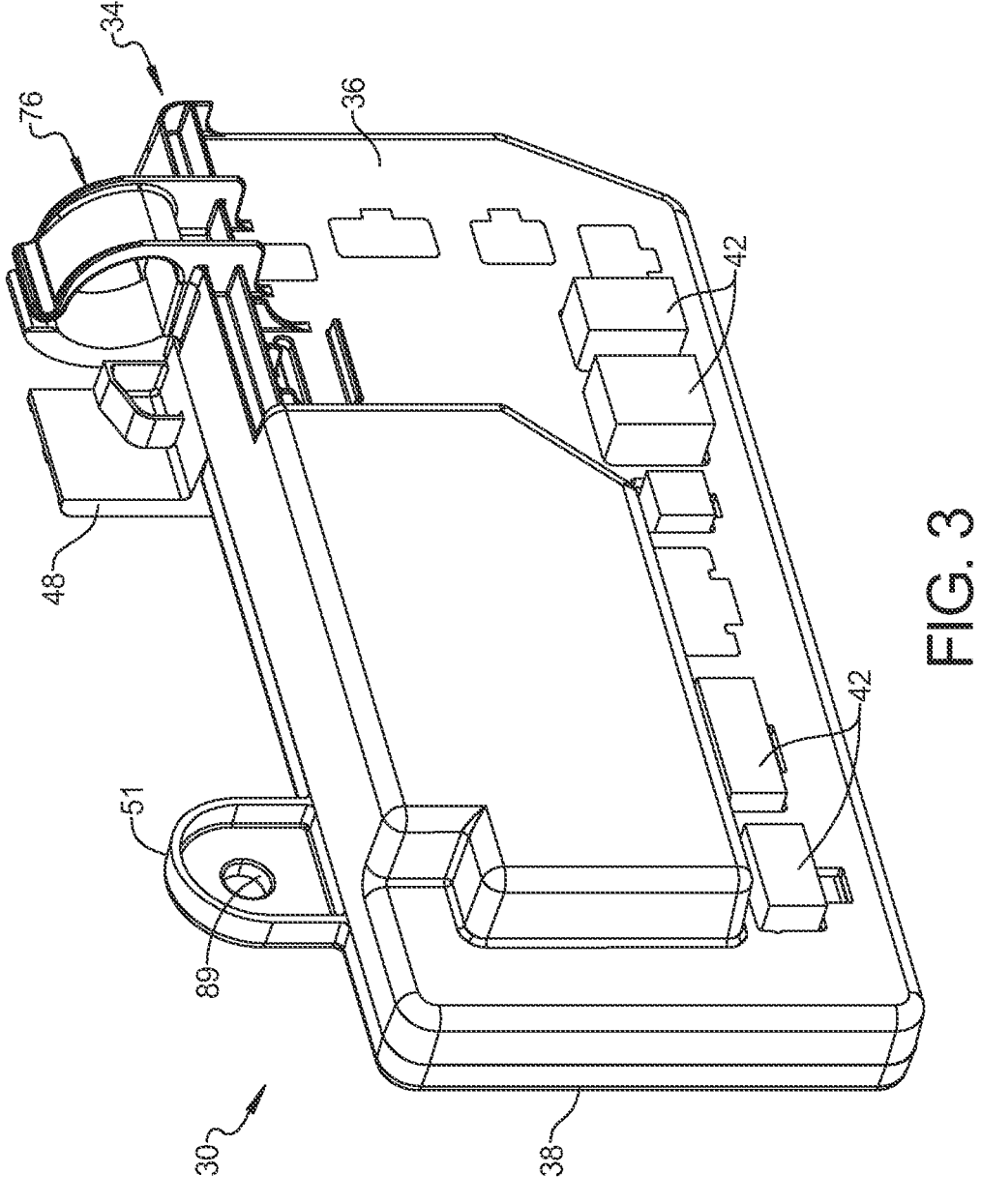
FIG. 3 is a perspective view of the circuit board assembly.

Referring now to FIGS. 2-12, the enclosure 34 may include a first shell 36 and a second shell 38 that cooperate to define a cavity in which the circuit board 32 is housed. The first and second shells 36, 38 may be attached to each other by a plurality of fasteners 40 (FIG. 2) and/or by a snap fit, for example. As shown in FIG. 3, the first shell 36 may include a plurality of various types of receptacles 42 that can be connected to plugs (not shown) to electrically connect the circuit board 32 with cables 78 (shown schematically in FIG. 12) connected to the power supply, the motors, the one or more user interfaces, and/or other electrical accessories.

Figure 4:
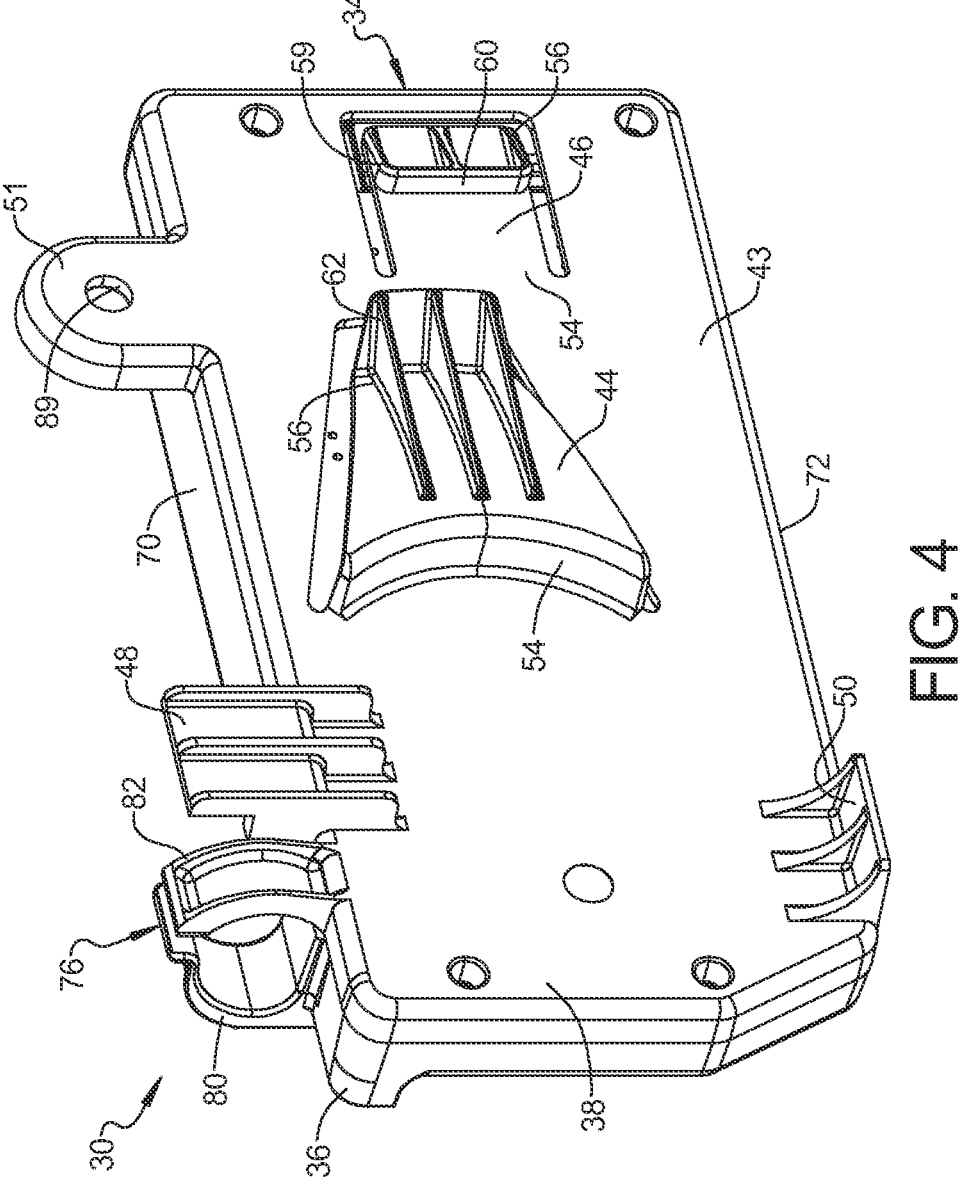
FIG. 4 is another perspective view of the circuit board assembly.
Figure 5:
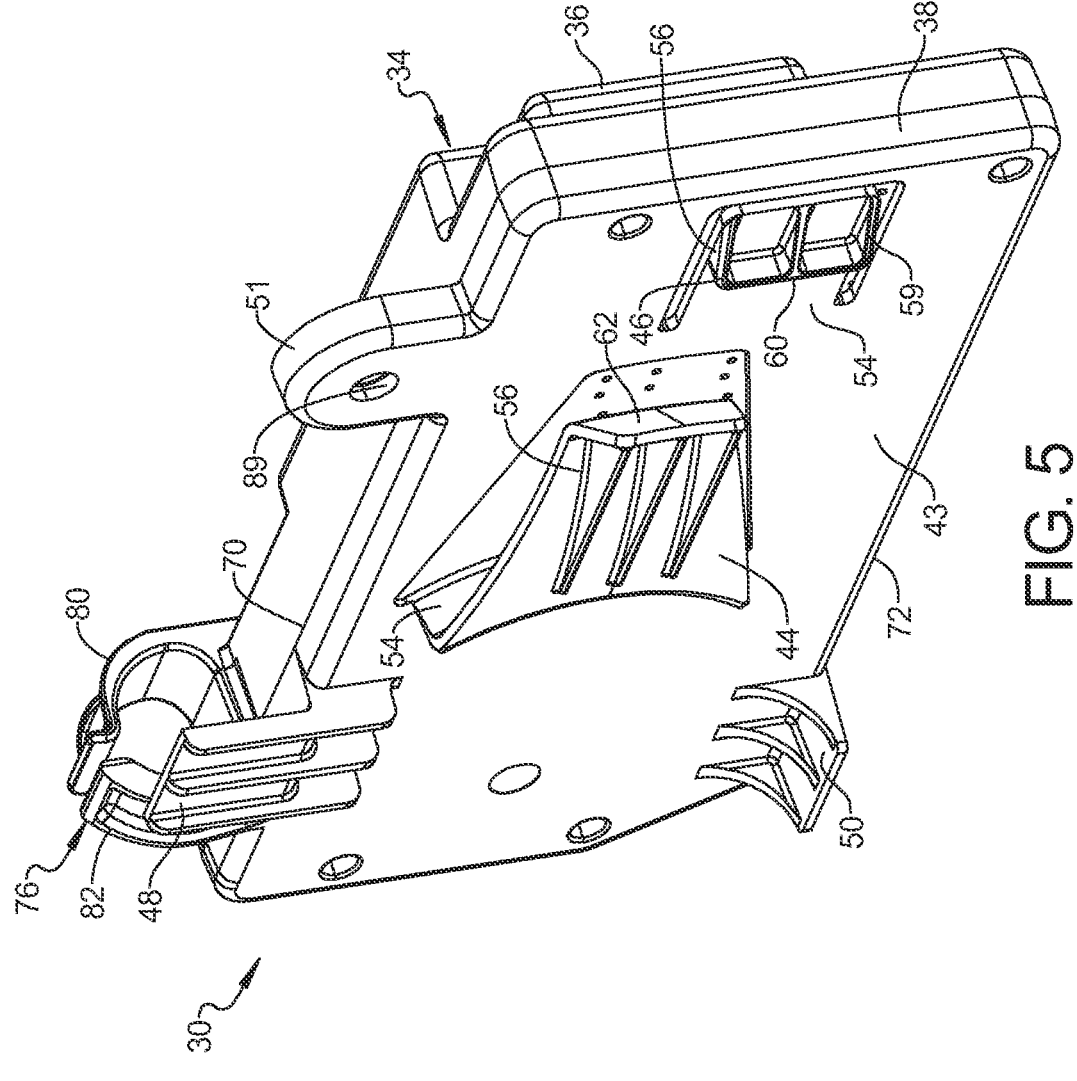
FIG. 5 is yet another perspective view of the circuit board assembly.
Figure 6:
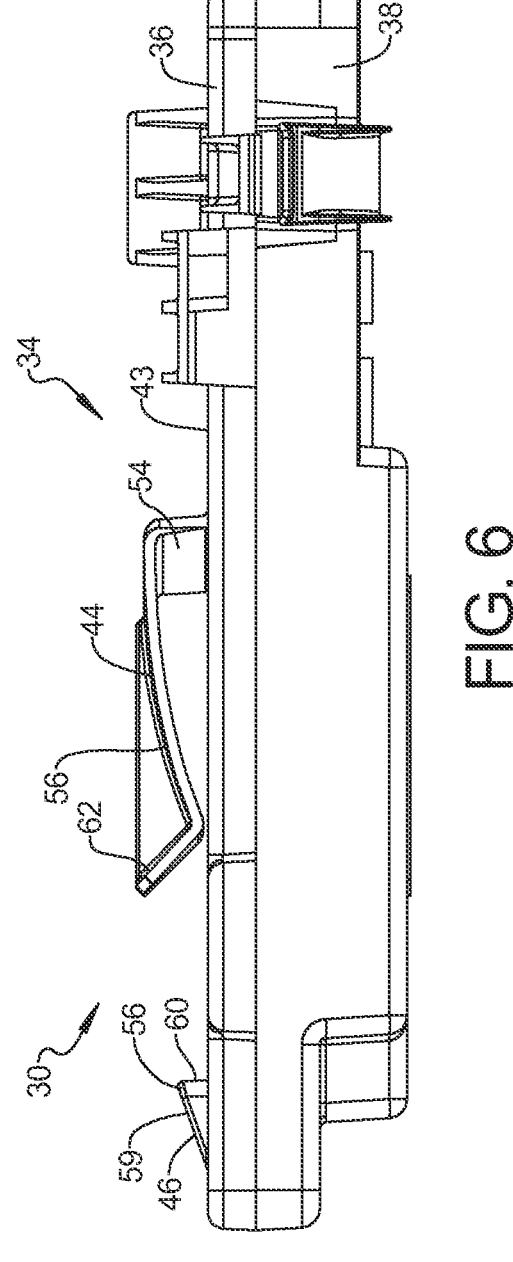
FIG. 6 is a top view of the circuit board assembly.
Figure 7:
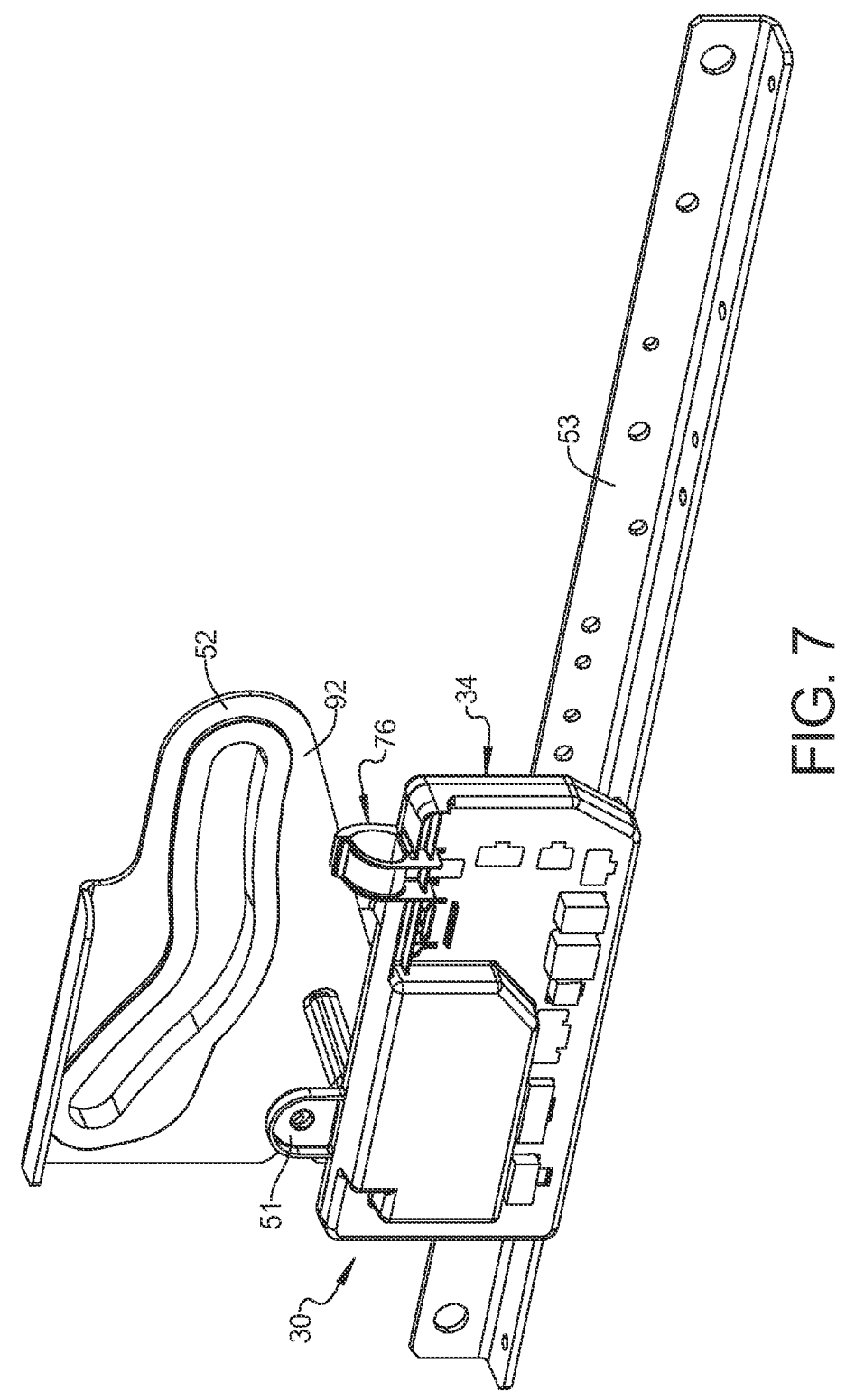
FIG. 7 is a perspective view of the circuit board assembly attached to a link and a beam.
Figure 8:
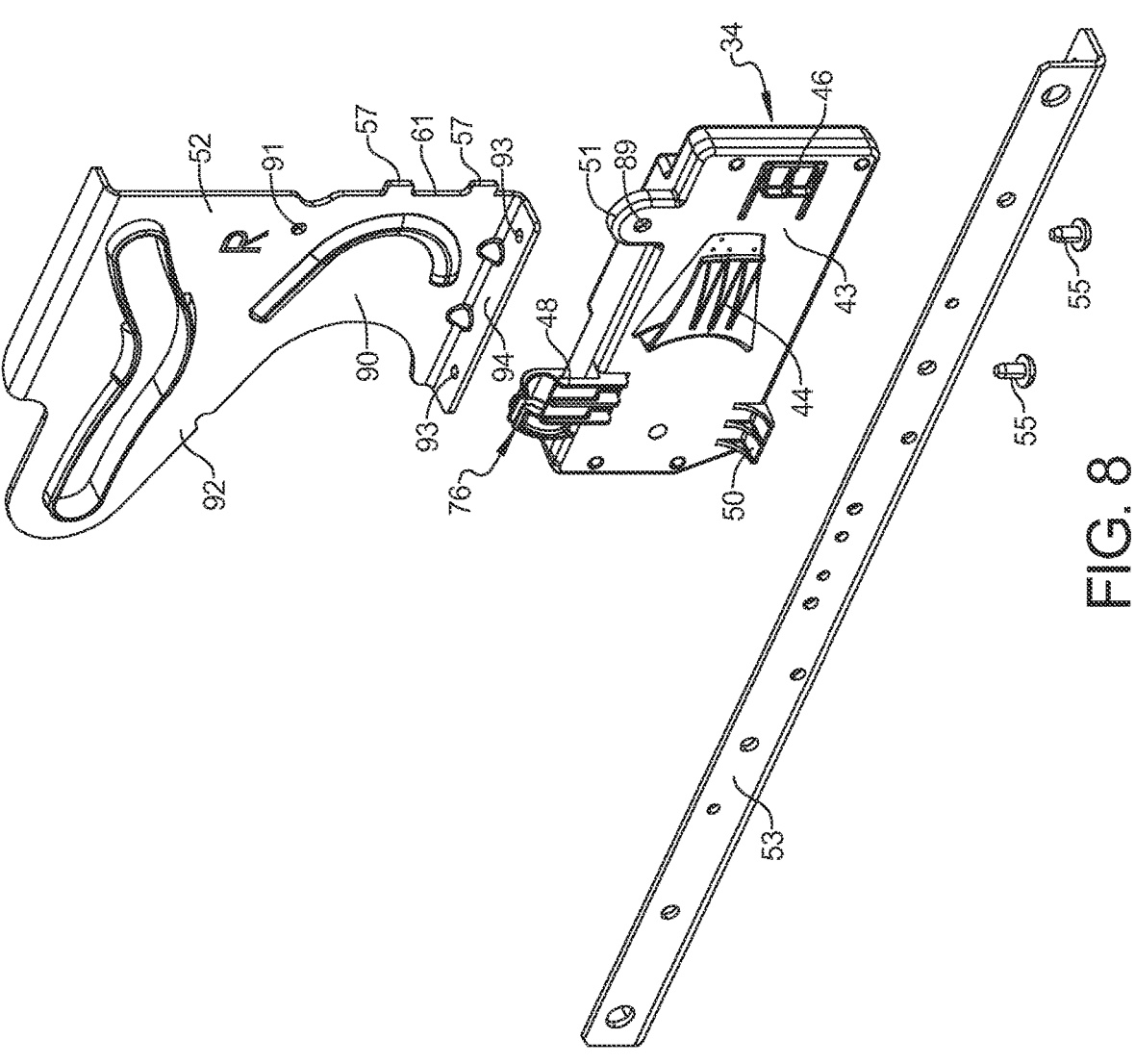
FIG. 8 is an exploded view of the circuit board assembly, the link and the beam.
Figure 9:
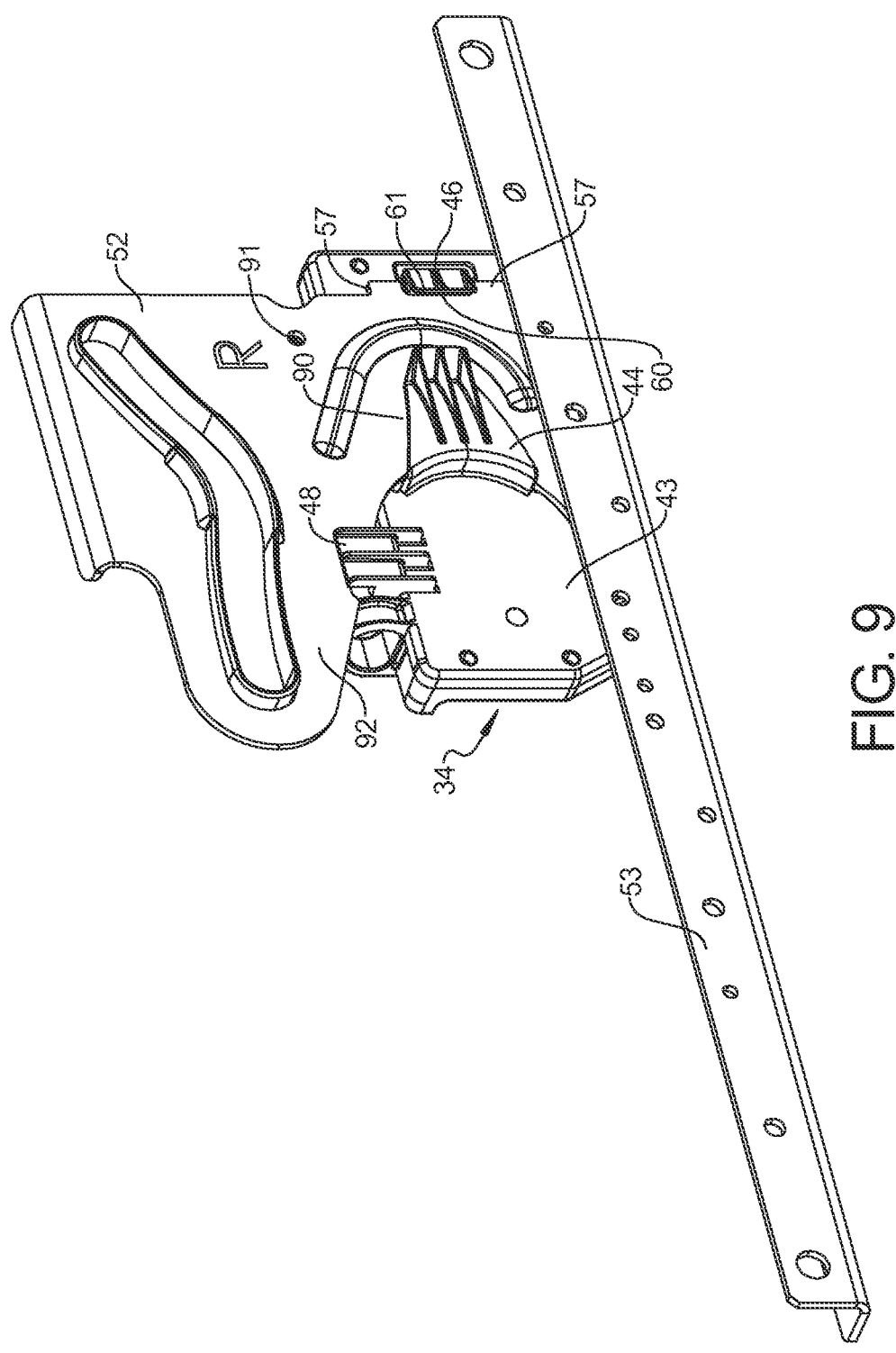
FIG. 9 is another perspective view of the circuit board assembly attached to the link and the beam.
Figure 11:
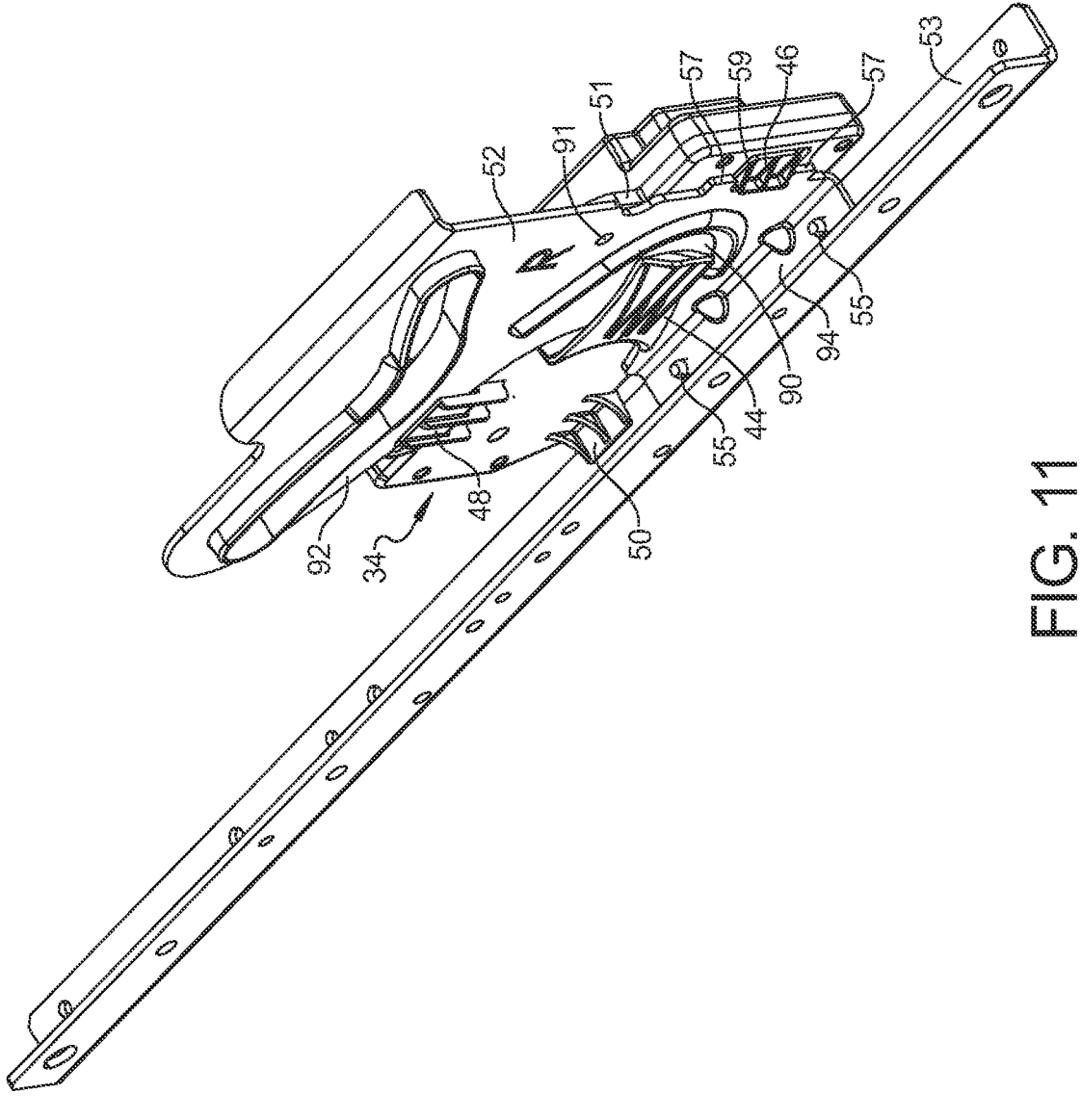
FIG. 11 is still another perspective view of the circuit board assembly attached to the link and the beam.

As shown in FIGS. 4 and 5, the second shell 38 of the enclosure 34 may include a body 43, a first clip 44, a second clip 46, a first tab 48, a second tab 50, and a third tab 51. As shown in FIGS. 7, 8, and 9, the clips 44, 46, the first tab 48, and the third tab 51 may cooperate with each other to engage a structure of the furniture item 10 such as a link 52 (e.g., a link 52 of a linkage configured to move one or more components of the furniture item 10). The clips 44, 46, the first tab 48, and the third tab 51 retain the enclosure 34 on the link 52 or other structure of the furniture item 10. For example, the link 52 could be a link of the legrest mechanism 16 or tilt mechanism, or any other linkage in the furniture item 10. As shown in FIG. 11, the second tab 50 may engage a beam 53 (e.g., a support beam of the base frame 12). The link 52 may also be attached to the beam 53 via a plurality of fasteners 55, as shown in FIG. 11.

The first and second clips 44, 46 may be resiliently flexible. Each of the first and second clips 44, 46 may include a fixed end 54 and a free end 56. The fixed ends 54 may be integrally formed with the body 43 of the second shell 38. The free ends 56 are unattached to the body 43 so that the clips 44, 46 can resiliently flex outward from the body 43 so that the link 52 can be received between the body 43 and clips 44, 46. The free end 56 of the first clip 44 may include a curved tip 62 that curves outward away from the body 43 to allow for easier insertion of the link 52 between the body 43 and the first clip 44. The fixed end 54 of the first clip 44 may have a curved shape that corresponds to a curved shape of and edge of the link 52 that is received in the first clip 44. The free end 56 of the first clip 44 may press down against the link 52 to retain the link 52 against the body 43 of the enclosure 34. The free end 56 of the second clip 46 may include ramped portion 59 defining a ledge 60 (FIG. 4) that may support and/or retain an edge 61 (FIGS. 9 and 10) of the link 52 and retain the link 52 between the ledge 60 and the fixed end 54 of the first clip 44. In some configurations, the edge 61 may be disposed between two tabs 57 (FIG. 8) formed on the link 52. The ramped portion 59 of the second clip 46 may be partially received between the tabs 57. A fastener (not shown) may extend through the third tab 51 and the link 52 to aid in securing the link 52 to the enclosure 34.

As shown in FIG. 4, the first tab 48 and the third tab 51 may extend from a first end 70 of the enclosure 34. The second tab 50 may extend from a second end 72 of the enclosure 34. The second end 72 may be opposite the first end 70. The second tab 50 may extend away from the body 43 of the enclosure 34 in a direction that is perpendicular to a direction in which the first and third tabs 48, 51 extend from the body 43.

The first tab 48 may act as an anti-rotation structure. That is, the first tab 48 may engage the link 52 to restrict or prevent relative rotation between the link 52 and the enclosure 34. Similarly, the second tab 50 may also act as an anti-rotation structure by engaging the beam 53 to prevent relative rotation between the enclosure 34 and the beam 53.

Figure 10:
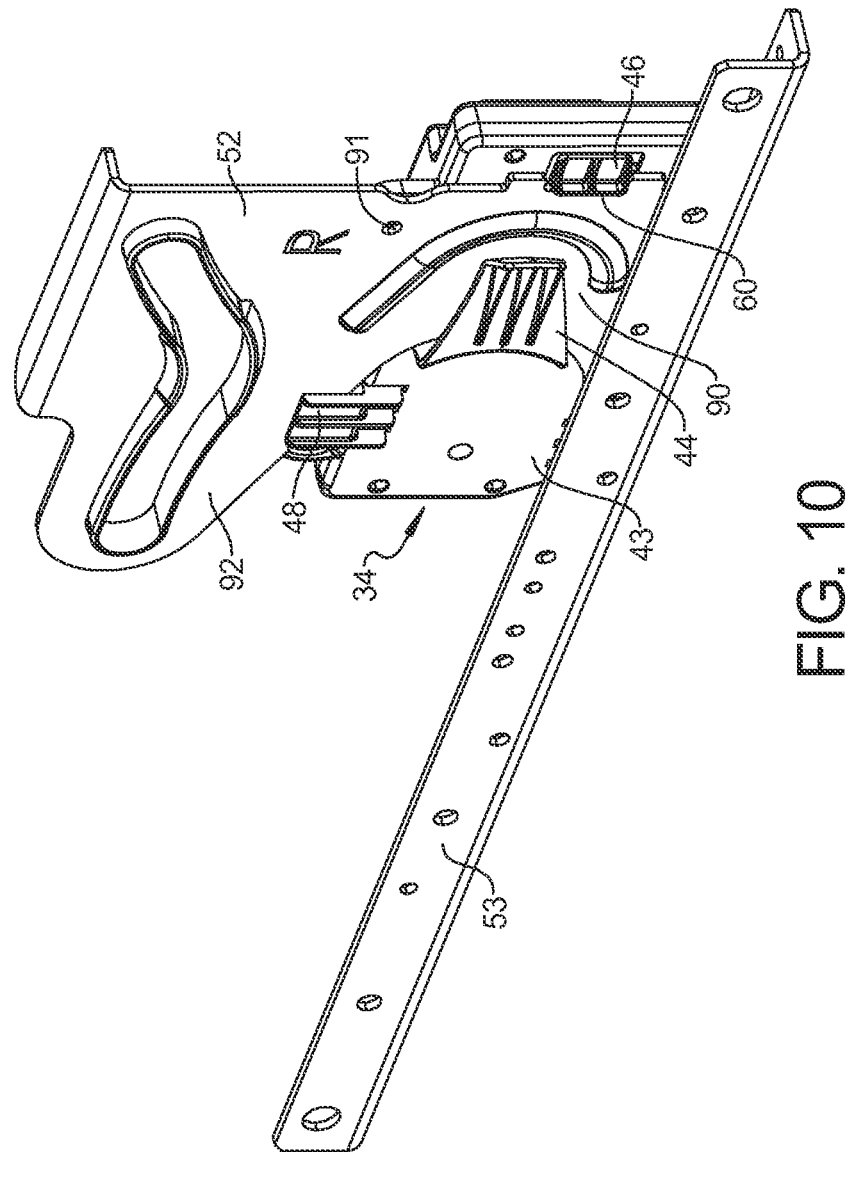
FIG. 10 is yet another perspective view of the circuit board assembly attached to the link and the beam.

To install the enclosure 34 onto the link 52, the enclosure 34 may be aligned with a first portion 90 (see FIG. 8) of the link 52 so that the first portion 90 can be slid into the first clip 44 (i.e., inserted between the body 43 of the enclosure 34 and the free end 56 of the first clip 44). Sliding the first portion 90 into the first clip 44 may cause the free end 56 of the second clip 46 to deflect into the cavity of the enclosure 34 (i.e., toward the circuit board 32). Once the first portion 90 of the link 52 is inserted far enough into the first clip 44 (i.e., once the edge 61 of the link 52 clears the ledge 60 of the second clip 46), the free end 56 of the second clip 46 may spring back out of the cavity of the enclosure 34 to the nominal position (shown in the figures) of the second clip 46. In the nominal position, interference between the ledge 60 and the edge 61 retains the first portion 90 of the link 52 between the fixed end 54 of the first clip 44 and the edge 61 of the second clip 46, as shown in FIGS. 9-11. A fastener (not shown) can be inserted through an aperture 89 in the third tab 51 and through an aperture 91 of the link 52. In this position, interference between the first tab 48 and a second portion 92 of the link 52 may restrict or prevent relative rotation between the link 52 and the enclosure 34. The link 52 may be attached to the beam 53 (i.e., via the fasteners 55 that engage the beam 53 and extend through apertures 93 (FIG. 8) formed in a flange 94 of the link 52) before or after the enclosure 34 is attached to the link 52. A surface of the second tab 50 and a surface of the flange 94 may be coplanar when the enclosure is fully installed on the link 52 and the link 52 is in contact with and fastened to the beam 53.

To remove the enclosure 34 from the link 52, the fastener can be removed from the aperture 91 of the link 52, and then the free end 56 of the second clip 46 can be pushed into (i.e., deflected into) the cavity of the enclosure 34 to allow the first portion 90 of the link 52 to be slid out of the first clip 44 (or the enclosure 34 can be slid off of the link 52).

Figure 12:
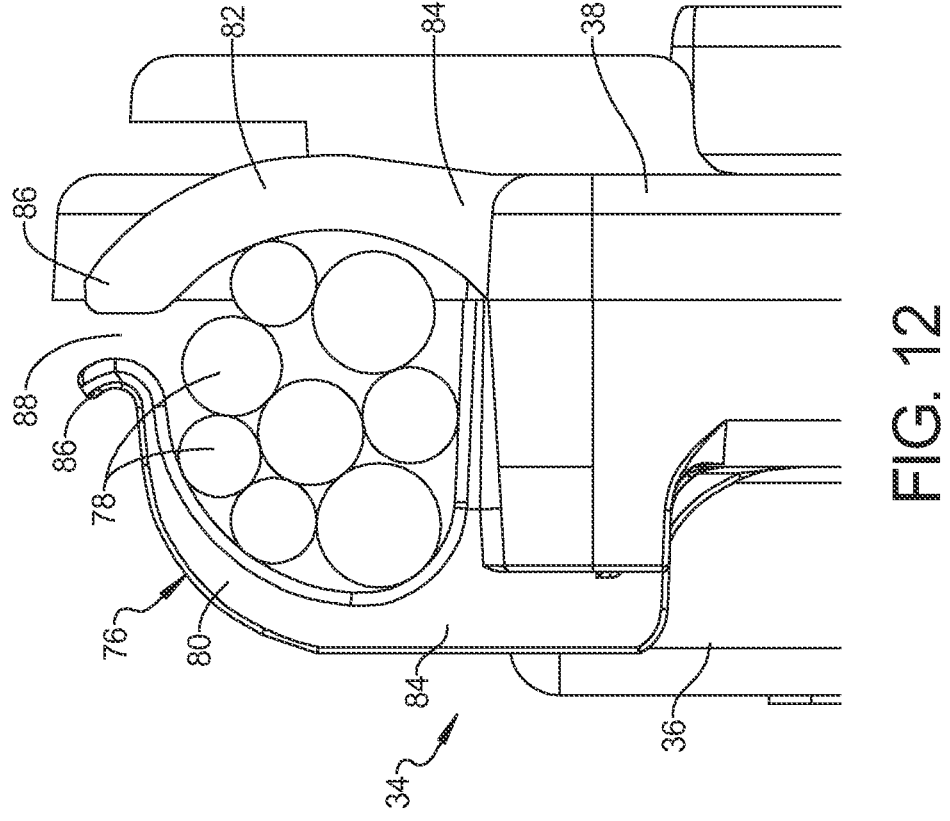
FIG. 12 is a partial side view of an enclosure of the circuit board assembly with wires received in a cable retainer of the enclosure.

The enclosure 34 may also include a cable harness or retainer 76 that may receive and retain a plurality of cables 78 (FIG. 12) that may be electrically connected to the circuit board 32 (e.g., via the receptacles 42) and electrically connected to the power supply, the motors, the one or more user interfaces, and/or other electrical accessories. As shown in FIG. 12, the cable retainer 76 may include a first arm 80 and a second arm 82. Each of the first and second arms 80, 82 may include a fixed end 84 and a free end 86. The fixed end 84 of the first arm 80 may be integrally formed with the first shell 36. The fixed end 84 of the second arm 82 may be integrally formed with the second shell 38.

As shown in FIG. 12, the first and second arms 80, 82 cooperate to define a channel 88 in which the cables 78 are received. The first and second arms 80, 82 can be resiliently flexed away from each other to widen or open a gap between distal tips of the free ends 86 to allow cables 78 to be inserted through the gap and into the channel 88. The tip of one or both of the arms 80, 82 may curve upward and outward away from each other to facilitate insertion of cables 78 through the gap. Once a cable 78 has been pressed through the gap and into the channel 88. The arms 80, 82 can resiliently flex back to their nominal positions to narrow or close the gap.

While the furniture item 10 shown in the figures is a chair, in other configurations, the furniture item 10 could be a sofa, loveseat, chaise, or any other type of furniture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A furniture item comprising:
a base frame;
a seat assembly supported by the base frame;
a linkage configured to move at least one component of the seat assembly; and
a circuit board assembly including a circuit board and an enclosure, wherein the circuit board is housed within the enclosure and is in communication with an electric component,
wherein the enclosure includes a body, a first clip attached to the body, a second clip attached to the body, a first tab attached to the body, and a second tab attached to the body,
wherein the first and second clips and the first tab engage a link of the linkage, and
wherein the second tab engages a beam of base frame.

2. The furniture item of claim 1, further comprising a motor operable to drive the linkage, wherein the circuit board is in communication with the motor.

3. The furniture item of claim 1, wherein the enclosure includes a cable retainer having a first arm and a second arm that cooperate with each other to form a channel that receives at least one electrical cable.

4. The furniture item of claim 3, wherein each of the first and second arms includes a fixed end and a free end, wherein the fixed ends of the first and second arms are integrally formed with a body of the enclosure, and wherein the free ends of the first and second arms are movable relative to the body and each other.

5. The furniture item of claim 1, wherein each of the first and second clips includes a fixed end and a free end.

6. The furniture item of claim 5, wherein the fixed ends are integrally formed with the body of the enclosure, wherein the free ends are resiliently movable outward relative to the body.

7. The furniture item of claim 6, wherein the free end of the first clip includes a curved tip that curves outward away from the body.

8. The furniture item of claim 7 wherein the free end of the first clip presses down against the link to retain the link against the body of the enclosure.

9. The furniture item of claim 8, wherein the free end of the second clip includes a ramped portion defining a ledge that retains an edge of the link and retains the link between the ledge and the fixed end of the first clip.

10. The furniture item of claim 9, wherein the edge is disposed between two tabs formed on the link, and wherein the ramped portion of the second clip may be partially received between the tabs formed on the link.

11. The furniture item of claim 9, wherein the first tab of the enclosure engages the link, and wherein the first and second tabs cooperate to prevent relative rotation between the enclosure and the link.

12. The furniture item of claim 11, wherein the first tab of the enclosure extends in a first direction relative to the body of the enclosure, wherein the second tab of the enclosure extends in a second direction relative to the body of the enclosure.

13. The furniture item of claim 12, wherein the first direction is perpendicular to the second direction.

14. The furniture item of claim 12, wherein the enclosure includes a third tab extending from the body and engaging the link.

15. The furniture item of claim 14, wherein the third tab extends in a direction parallel to the first direction.

16. The furniture item of claim 9, wherein the ledge of the second clip faces the free end of the first clip.

17. The furniture item of claim 16, wherein the free end of the first clip is disposed between the ledge of the second clip and the fixed end of the first clip.

18. The furniture item of claim 17, wherein the fixed end of the second clip is disposed between the ledge of the second clip and the free end of the first clip.

19. The furniture item of claim 18, wherein the fixed end of the first clip is curved.

20. The furniture item of claim 18, wherein the free end of the second clip is depressible into an internal cavity of the body of the enclosure, and wherein the circuit board is disposed within the internal cavity.

21. The furniture item of claim 20, wherein the fixed end of the first clip extends away from a surface of the body of the enclosure, and wherein the fixed end of the second clip is flush with the surface of the body of the enclosure.

* * * * *